United States Patent [19]

Carper et al.

[11] Patent Number: 4,822,671

[45] Date of Patent: Apr. 18, 1989

[54] HEAT RIVETING RUBBER FOR EFFECTING A MECHANICAL LOCK

[75] Inventors: Robert L. Carper, Brighton, Mich.; James R. Goewey, Marion, Ind.

[73] Assignee: GenCorp Inc., Akron, Ohio

[21] Appl. No.: 140,194

[22] Filed: Dec. 31, 1987

[51] Int. Cl.$^4$ ............... B21D 31/00; B29C 65/00

[52] U.S. Cl. ........................ 428/33; 264/249; 411/501; 428/174

[58] Field of Search ............ 428/33, 174, 522; 411/501; 264/249, 25, 1.4

[56] References Cited

U.S. PATENT DOCUMENTS

| | | | |
|---|---|---|---|
| 3,308,225 | 3/1967 | Wells | 264/249 |
| 3,458,618 | 7/1969 | Burns et al. | 264/249 |
| 3,544,143 | 12/1970 | Ohlsson | 411/501 |
| 3,754,319 | 8/1973 | Miori | 264/249 |
| 4,253,226 | 3/1981 | Takeda | 264/249 |
| 4,414,166 | 11/1983 | Charlson et al. | 264/249 |

Primary Examiner—Paul J. Thibodeau

[57] ABSTRACT

A process for mechanically bonding a sheet of rubber to a sheet of another, e.g. a reinforcing, material, and a composite article made by the process. A molded sheet of rubber having integral upstanding posts is assembled with the sheet of the other material in such a manner that the posts extend through openings in the sheet of the other material. The distal ends of the rubber posts are then reformed (preferably by heating) to shape or form the rubber posts into rivets which mechanically lock the rubber sheet and the sheet of other material together and provide good shear resistance. According to another embodiment of the present invention, the reinforcement material is a high melting temperature plastic which has an upstanding post and the molded rubber sheet and has openings therein. The plastic posts are reformed as with a laser to bond the plastic sheet to the rubber sheet.

10 Claims, 2 Drawing Sheets

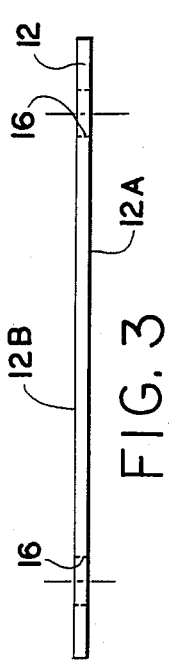
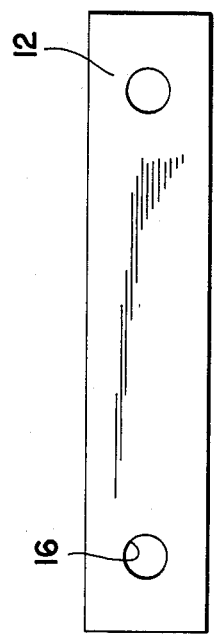
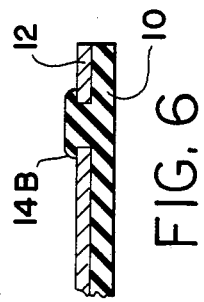
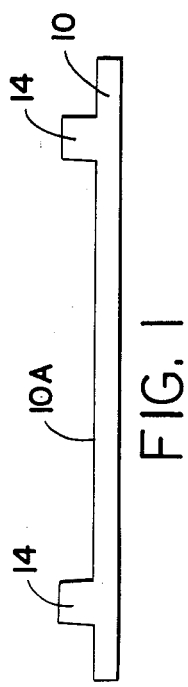
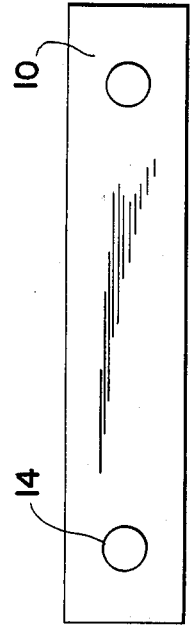
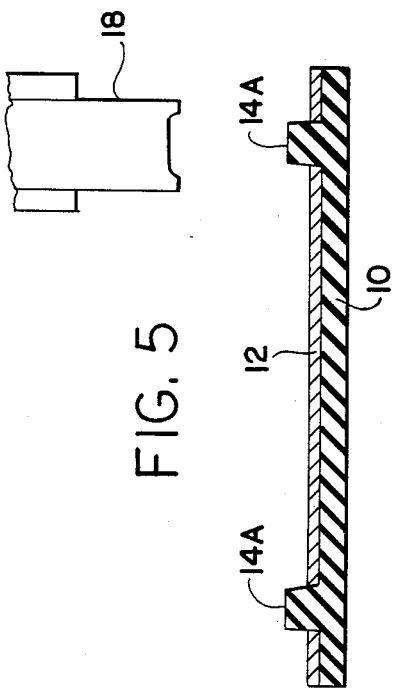

HEAT RIVETING RUBBER FOR EFFECTING A MECHANICAL LOCK

FIELD OF THE INVENTION

The present invention relates to a process for mechanically locking a sheet of rubber to a sheet of a reinforcing or attaching material, usually a metal or a high temperature melting plastic. Further, the invention relates to a composite article made by such a process, i.e., a sheet of rubber mechanically bonded to a sheet of another material by means of a rubber rivet that is integrally formed from the sheet of rubber. Alternatively, a sheet of rubber is mechanically bonded to a sheet of a plastic material by means of a plastic rivet integrally formed from the sheet of plastic material.

BACKGROUND

In the manufacture of parts such as rubber gaskets, it is common practice to reinforce the rubber material with a sheet of another or a reinforcing material such as metal or a high temperature melting plastic. Moreover, it is known to provide an adhesive bond between the rubber and the other material to form a composite sheet which combines the characteristics of both materials.

It has been found that a chemical bond between the rubber and the reinforcing material may break down in certain applications when subjected to certain extreme conditions. For example, when such a composite structure is used to form a gasket for an automobile headlamp, the adhesive (chemical) bond between the rubber and the metal reinforcement may break down under the heat generated by the headlamp. Since the forces applied to such bond are primarily in shear, a breakdown of the adhesive bond can result in significant damage to the gasket.

Accordingly, there is a need to provide a mechanical bond for composite articles wherein rubber is adhered to a reinforcing material, and to provide a mechanical bond which generally resists shear forces which would otherwise tend to break down a chemical bond (i.e. an adhesive joinder) between the materials.

SUMMARY OF THE INVENTION

Accordingly, it is an aspect of the present invention to provide a process for mechanically bonding rubber to a reinforcing or attaching material in such a way that the mechanical bond resists shear forces. Another aspect of the present invention relates to a composite article made by such a process.

According to the concepts of the present invention, a rubber part is initially molded with integral rubber posts that can mate with openings (e.g. matingly engage) formed in a reinforcing or attaching material. The rubber part is then assembled with the reinforcing material in such a way that the rubber posts protrude through the openings in the reinforcing material. The distal ends of the rubber posts are then reformed (that is shaped as by heating), to form a rubber rivet that mechanically locks the rubber part to the reinforcing material. Such a mechanical rivet in association with an adhesive (chemical) bond between the rubber part and the reinforcing material provides a secure coupling of such members and form a composite which resists shear forces that could otherwise fracture or break the adhesive bond.

The composite product made according to the invention basically comprises a rubber sheet and a sheet of a reinforcing material bonded thereto with a rubber rivet integrally formed from the rubber sheet and effective to resist separation of the members mechanically, under both tension and especially shear forces.

According to other concepts of the present invention, a high melting temperature plastic is initially molded having integral plastic posts which can mate with an opening in a rubber sheet. The posts can be transformed into a rivet through the use of localized heat such as that generated by a laser.

The present invention will be better understood by reference to the following drawings and to the detailed description.

BRIEF DESCRIPTION OF THE DRAWINGS

FIG. 1 is a side elevational view of a rubber part for use in forming a composite according to the present invention;

FIG. 2 is a top plan view of the rubber part of FIG. 1;

FIG. 3 is a side elevational view of a metal reinforcing part forming part of the composite of the present invention;

FIG. 4 is a top plan view of the metal part of FIG. 3;

FIG. 5 schematically illustrates the manner in which the rubber and metal parts are contiguously assembled with posts of the rubber part extending through the metal reinforcement;

FIG. 6 is a schematic fragmentary cross-sectional view of the mechanical interlock between the metal and the rubber part.

DETAILED DESCRIPTION OF THE INVENTION

Figure 7:
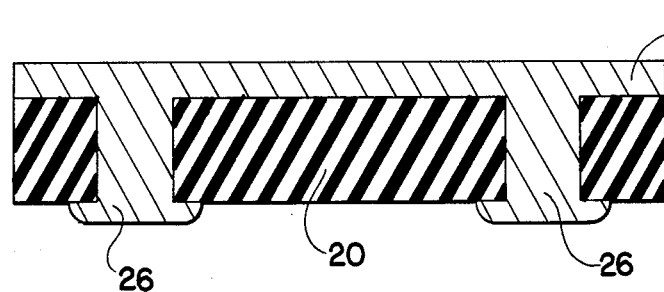
FIG. 7 is a cross-sectional view of a mechanical interlock between a plastic sheet and a metal sheet according to another embodiment of the present invention.

FIGS. 1 through 4 show the basic profile of a rubber sheet 10 and a reinforcing sheet 12 which are mechanically interlocked according to the concepts of the present invention. As seen in FIGS. 1 and 2, the rubber sheet 10 includes a pair of integral, upstanding posts 14. As seen in FIGS. 3 and 4, the reinforcing sheet 12 has a pair of openings 16 positioned or dimensioned to mate with the rubber posts 14 on the rubber sheet 10.

The rubber material of the present invention is generally any elastomer which can be reformed or shaped at high temperatures, for example at about 700° to about 800° F. Naturally, a temperature is utilized which melts or causes rubber posts 14 to flow. Ethylene-propylene type elastomers constitute a suitable class of rubber for use in the present invention. Such elastomers include ethylene-propylene rubber (EPR), ethylene-propylene-diene rubber (EPDM), and combinations thereof. EPDM contains small amounts of non-conjugated diene units therein. That is, as known to the art as well as to the literature, EPDM is made from monomers of ethylene, propylene and various small amounts of a non-conjugated diene generally having from 5 to about 10 carbon atoms with specific examples including pentadiene, hexadiene, norbornene, methylnorbornene, ethylidenenorbornene, and the like. The amounts of the various components of EPR and EPDM are well known to the art and to the literature and are generally conventional. The ethylene-propylene type elastomers are generally cured in a conventional manner. However, the high heat reforming temperature is sufficient to break down the crosslinks forming the cured system and permits the elastomer to flow and assume another shape.

Considering the reinforcing sheet 12, it must be able to withstand such high reforming temperatures. It is thus generally any metal such as steel, or it can be a plastic which has a melting point above the reforming temperature.

Preferably, rubber sheet 10, including integral posts 14, is formed as a single, molded article. The reinforcing sheet 12 when metal can be formed by conventional metal forming techniques (e.g., stamping) with the openings 16 integrally formed therein.

In forming a rubber-reinforcing composite, the reinforcing and rubber sheets are assembled with the surfaces 10A, 12A in juxtaposed relation, and with the openings 16 in the metal sheet 12 located over the rubber posts 14 (see FIG. 5). In such a relationship, the distal ends 14A of the posts 14 extend beyond the other surface 12B of the metal sheet. Before rubber sheet 10 and reinforcing sheet 14 are brought together, either one or both of juxtapositioned or contiguous surfaces 10A and 12A are coated with a thin layer of an adhesive. Any conventional adhesive can be utilized including those known to the art and to the literature.

In order to form the mechanical interlock between the reinforcing (e.g. metal) and rubber sheets, a heating element 18 is brought into contact with rubber posts 14, to reform or deform the rubber posts. That is, distal ends 14A of post 14 are melted and reshaped in the form of a rubber rivet so that a mechanical lock is created between the rubber sheet and the reinforcing sheet. Thus, in FIG. 5, heating element 18 modifies the distal ends 14A of the rubber posts in such a way as to reform, deform, or shape it to the profile shown in FIG. 6. The reformed rubber post 14 includes a retaining lip 14B which faces and can act against the opposite side 12B of the reinforcing sheet, to mechanically retain the rubber and reinforcing sheets together. However, a primary advantage of the reformed rubber post is good shear resistance.

The product made by the process of this invention is shown in FIG. 6. The reinforcing and rubber sheets 12 and 10 are juxtaposed with interfacing surfaces 12A and 10A that are adhesively bonded together. The rubber posts 14 extend through the openings 16 in the reinforcing (e.g. metal) sheet 12, and its reformed or deformed lip 14A forms a rivet head which mechanically retains the rubber and reinforcing sheets 10 and 12 together. Hence, a process has been provided to form a secure and effective mechanical bond. Such mechanical bond, when coupled with the adhesive bond, effectively retains the materials together, especially under shear conditions.

According to other concepts of the present invention, a high melting temperature reinforcing plastic part 22 is initially molded with integral plastic posts 26 that can mate with openings formed in a rubber part or sheet 20. The plastic reinforcing part which is made of a high temperature plastic, that is a plastic having a melting point of at least 500° or 600° F. and desirably at least 700° or even 800° F. such as polyimide, polyamide, or high melting polyesters, is then assembled with the rubber material in such a manner that plastic posts 26 protrude through the openings of the rubber material. The distal ends of the plastic posts are then reformed utilizing localized heat so as to not degrade the adjacent rubber material to form a plastic rivet that mechanically locks the plastic reinforcing part to the rubber material.

An example of a suitable localized heat source is a laser. Other localized heat sources include a directional flame, and the like. The resulting mechanical rivet in association with an adhesive bond between the rubber part and the plastic reinforcing material provides a secure coupling of such members and forms composite which resists shear forces, in a manner similar to that described hereinabove. Otherwise, the remaining aspects of the embodiment containing the integral plastic reinforcing posts and a rubber part having openings or apertures therein is similar to the description set forth hereinabove with regard to FIGS. 1 through 6. Hence, the type of rubber material, the mating engagement or location of openings in the rubber with integral posts 26, the joinder of reinforcing sheet 22 with rubber sheet 20, and the like, is fully discussed hereinabove.

The present invention can be utilized wherever a rubber sheet is reinforced by a metal or a high melting temperature plastic sheet, or the like. A preferred area of use is in the formation of headlight guide gaskets as used on an automobile.

While in accordance with the Patent Statutes, the best mode and preferred embodiment have been set forth, the scope of the invention is not limited thereto, but rather by the scope of the attached claims.

What is claimed is:

1. A process for mechanically bonding a rubber part to a reinforcing part, comprising the steps of:
   (i) forming the rubber part with at least one upstanding post, said rubber part made from an ethylene-propylene rubber, an ethylene-propylene-diene rubber, or combinations thereof;
   (ii) providing a reinforcing part with an opening for receiving said rubber part post;
   (iii) assembling said rubber part and said reinforcing part with said rubber post extending through the opening in said reinforcing part; and
   (iv) reforming said rubber post by heating so as to provide a mechanical bond between said rubber part and said reinforcing part.

2. A process according to claim 1, wherein said rubber part comprises a rubber sheet having an upstanding post, and wherein said reinforcing part comprises a sheet of a reinforcing material having said opening therein, said step of assembling said rubber and said reinforcing part comprising the steps of placing said rubber sheet and said reinforcing sheet together with respective surfaces in juxtaposed relation and with said rubber post extending through the opening with its distal portion extending beyond the opposite surface of said reinforcing sheet, said step of reforming said rubber part comprising the step of reforming said distal portion of said rubber post to lock said distal portion of said rubber post against the opposite surface of said reinforcing sheet.

3. A process according to claim 2, including the step of forming said rubber sheet and said post as a single integrally molded element.

4. A process according to claim 3, including the step of chemically bonding said juxtaposed surfaces of said sheet of rubber and said reinforcing sheet.

5. A process according to claim 3, wherein said reinforcing sheet is a metal sheet.

6. A composite material, comprising:
   a rubber sheet having a first surface and a sheet of a different material with a surface juxtaposed to said first surface of said rubber sheet, said rubber sheet made from an ethylene-propylene rubber, an ethylene-propylene-diene rubber, or combinations thereof, said rubber sheet having a post protruding from said first surface and said sheet of said other material having an opening mating with said post in such a manner that said post extends through the opening in said sheet of said other material, the distal end of said rubber post having the profile of a rivet for mechanically retaining said rubber sheet to said sheet of said other material.

7. A composite material according to claim 6, wherein said sheet of said other material is a reinforcing sheet.

8. A composite material according to claim 7, wherein the first surface of the rubber sheet and the juxtaposed surface of said different material sheet are chemically bonded to each other.

9. A composite material according to claim 8, wherein said rubber sheet and said post comprises an integrally molded rubber element, and wherein said rubber sheet and said rubber element is an ethylene-propylenediene rubber, an ethylene-propylene rubber, or combinations thereof.

10. A composite material according to claim 9, wherein said different material sheet is a metal sheet.

* * * * *